Nov. 2, 1954    H. KRUPP    2,693,103
MAGNETIC GAS MEASURING INSTRUMENT
Filed July 17, 1951

INVENTOR
HELMAR KRUPP
BY
ATTORNEY

United States Patent Office 2,693,103
Patented Nov. 2, 1954

2,693,103

MAGNETIC GAS MEASURING INSTRUMENT

Helmar Krupp, Frankfurt am Main, Germany, assignor to Hartmann & Braun Aktiengesellschaft, Frankfurt am Main, Germany, a corporation of Germany Application July 17, 1951, Serial No. 237,250

Claims priority, application Germany July 25, 1950

10 Claims. (Cl. 73—27)

This invention relates to instruments for the determination of the paramagnetic gas content, especially oxygen content, in gaseous mixtures in which the gas mixture is exposed to a magnetic field. In my instrument the temperature changes of a heated body in an inhomogeneous part of the field are determined and such changes result in accordance with the proportion of paramagnetic gas in the mixture.

An object of the invention is to produce instruments distinguished by an especially high degree of sensitivity and simplicity of construction.

The instrument according to the invention has, in the test gas space, the two poles of a strong permanent magnet which stand a slight distance apart. A heater wire element in the form of a ring is disposed on various described forms of carriers parallel to the pole shoes of the magnet. The wire is heated from an electric current and its resistance in a circuit can be measured. The amount of the resistance is a measure of the content of paramagnetic constituents in the gases. In the drawing Fig. 1 shows one form of the carrier disposed near magnet pole pieces;

Figure 1:
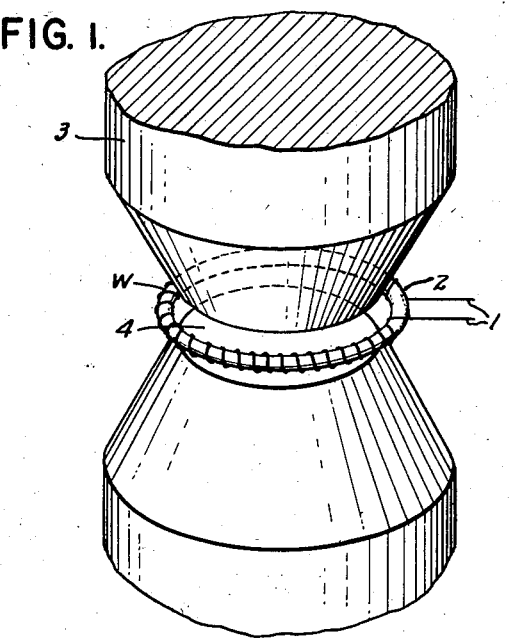

There is shown in Fig. 1 the heater wire W in the magnetic field of the pole shoes or pieces 3 and 4 which are shown round. The pieces 3 and 4 may be part of a permanent magnet such as a horseshoe magnet 15 shown in Fig. 6 so excited that there is formed in the gap between pole pieces a strong magnetic field. The wire W is generally parallel to the opposed pole pieces and arranged in the form of a ring in the inhomogeneous part of the field. The wire may be formed into a simple loop ring (Fig. 6) or may be coiled on a toroidal carrier 2. The carrier may be of glass or any other suitable material. The terminal portions of the wire are shown as at 1.

In operation, the paramagnetic constituents of the gas mixture are, as any paramagnetic substance, induced to move toward the region of greatest field strength, and accordingly into the space between the magnet poles. There, a concentration of paramagnetic molecules develops with an attending increase in pressure. If now, the gas at any one place becomes warm then at this place the magnetic properties of the gases become altered. Thereby an alteration of the pressure distribution in the gas occurs, and indeed at warm places the magnetic action, and with it the pressure, becomes reduced. The cool gas, which exhibits a higher pressure, flows toward the warmed regions, displaces the warm gas, but there becomes warmed itself so that a constant stream of cool gas toward the warm regions is produced. In the above described arrangement the warming of the gases is produced by the heater wire.

As explained above there occurs a continuous flow of cool gas thither to the heater wire and of warm gas away from the wire. Because of this there is a cooling off of the wire which conforms to the paramagnetic content of the gas and which can be electrically measured. Since the wire ring is arranged parallel to the pole pieces an even flow from all sides, and an especially good action, is produced.

Figure 6:
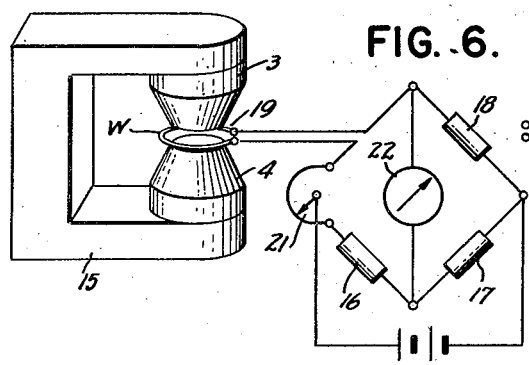
Fig. 6 is a diagrammatic representation showing how the temperature of the heater wire is determined.
Figure 8:
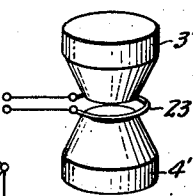
Fig. 8 is an alternative element in the representation of Fig. 6.

The various influences on the wire can be detected by an arrangement as shown in Fig. 6 where the wire loop 19 is associated with a magnet as described of Fig. 1. The wire W is interposed in a Wheatstone bridge comprising fixed resistances 16, 17 and 18 and the resistance of the heater wire. The bridge is fed by a battery 20 strong enough to produce sufficient warming of the wire loop 19. By means of a potentiometer 21 the bridge can be balanced. If the device is supplied with a gas having paramagnetic properties the heater wire experiences a temperature change, as explained, and a variation in its resistance. This variation is indicated by the bridge galvanometer 22.

In order to make the system independent of external temperatures a second wire 23, sufficiently like the wire loop 19, may be substituted for the resistance 18 but free from magnetic effects and hence it has no magnetic action on the magnetic constituents.

The invention may take several forms—

In Fig. 1 the heater wire is wound on a round insulating-material carrier 2, for example of glass which is mounted by means (not shown) between the two magnet poles 3 and 4. It is also possible, in place of the relatively small size heater wire arrangement as shown in Fig. 1 to use one which heats a greater space so that the inhomogeneity of the field is better utilized. In such a case, one might for example, use for a support ring several separated carrier rings and the wire wound upon them as on edges of a prism.

As an example of such a "prismatic" support—

Figure 2:
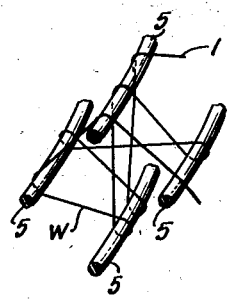
Fig. 2 shows a fragmental portion of another form of the carrier with the heater wire thereon.

Fig. 2 shows only a fragmental part of the support ring. The several isolated ring carriers 5, as elemental parts of a circle, are comparable to the edges of a prism. The arrangement of the wire is such that not only is the wire outer and over of the support ring 5 but also diagonal through the interior so that the entire embraced space of the support ring will be heated up. Of course the elements 5 may be separately mounted and need not be part of a full ring.

Figure 3:
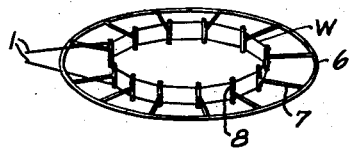
Fig. 3 shows another form of the carrier.
Figure 5:
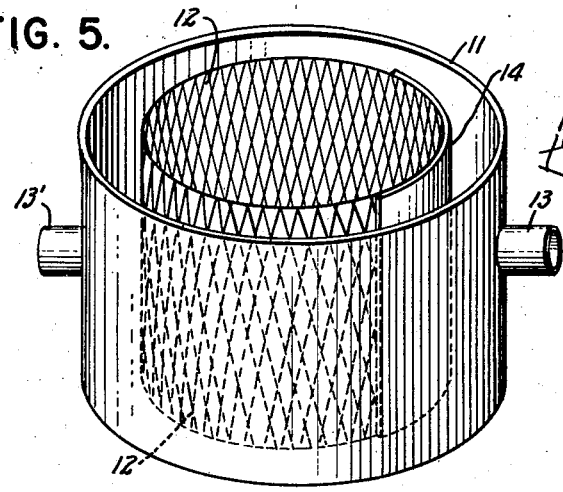
Fig. 5 is a perspective of a chamber in which the magnet and heater wire may be located.

Fig. 3 shows an arrangement where the wire is not wound in small coils. The outer ring 6 carries radial inner stays 7 provided with little transverse stakes or pins 8 on the inner ends. The wire W is wound one or more times around these stakes. The radial stays 7 may be fixed at the inner end and the wire wound on stakes at their outer ends.

Figure 4:
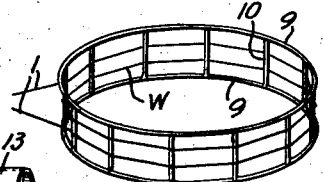
Fig. 4 shows yet another form of the carrier.

Fig. 4 shows a support of the heater wire comprising upper and lower rings 9 secured together on vertical stays 10. The wire is wound upon these stays 10.

Figure 7:
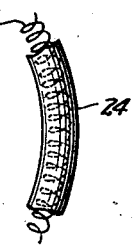
Fig. 7 is a fragmental view showing the heater wire and a glass tube.

In order to protect against or prevent the catalytic burning of the wire by a direct contact between the wire and test gas, the wire may be covered with heat and corrosion resistant material such as silicone lacquer, enamel or silica. The wire may be made into a helical coil and inserted in a glass capillary tube 24 which may be softened and bent into a ring form a fragment of which is shown in Fig. 7.

In order to avoid stirring of the gas stream in the testing chamber by the gas feed it is appropriate to surround the whole apparatus with a wire net, and to shut off this, if necessary, at the place at which the gas feed enters.

As an example, the magnetic system may be employed in a test chamber 11 for the gases. A wire gauge or net 12 of cylindrical shape is provided within the chamber to diffuse gas entering the inlet connection 13. The gas flow at the inlet 13 is prevented from being localized or concentrated there near by a plate 14 opposite the inlet. The exit of the gases from the chamber is provided for by a connection 13' similar to that provided for the supply. The magnet poles may project downwardly and up into the gauge and have the heater wire mounted between the poles as shown.

It is especially desirable that the plane of the heater wire ring be horizontal but it is possible that it lie in another position.

It is also not absolutely necessary that the pole pieces of the magnet be round. They may be in the form of squares or of elongated rectangles. In such a case the ring would take a form having corners.

The invention claimed is:

1. In an apparatus for measuring the content of paramagnetic gases in gas mixtures, a measuring chamber, a magnet having pole faces for producing a non-homogeneous magnetic field within said chamber, said pole faces having parallel peripheral edges and a ring-shaped electrical heating element having a wire winding and provided with terminals and within said non-homogeneous magnetic field and said chamber, the element extending around and parallel with the peripheral edges of the magnet pole faces.

2. In an apparatus for measuring the content of paramagnetic gases in gas mixtures, a measuring chamber, a magnet having pole faces for producing a non-homogeneous magnetic field within said chamber, said pole faces having parallel peripheral edges, and a ring-shaped electrical heating element having a wire winding and provided with terminals and within said non-homogeneous magnetic field and said chamber, the element extending around and parallel with the peripheral edges of the magnet pole faces; means of admitting gas to the chamber, the gas mixture entering the measuring chamber being caused to flow as a result of the combined magnetic and heating action of the magnet and heating element respectively over the heater element, the change of temperature of the heater element being a measure of the paramagnetic gas content of the gas mixture.

3. Apparatus for measuring the content of paramagnetic gases in gas mixtures comprising a measuring chamber, a magnet having opposed circular pole faces having parallel peripheral edges for producing a non-homogeneous magnetic field within the measuring chamber and a ring shaped electrical heating element within said non-homogeneous magnetic field and said chamber, the element including a coil of wire having terminal ends for determining changes in the electrical properties of the wire as the gases pass through the chamber near said wire, the element being arranged to extend around and parallel with the peripheral edges of the magnet poles, the heating element and the relative opposite edges of the magnet poles being situated in horizontal planes.

4. Apparatus according to claim 2 and a Wheatstone bridge wherein the heating element terminals are connected to one arm of the Wheatstone bridge.

5. Apparatus according to claim 2 wherein the heating element comprises a support consisting of a plurality of coaxial rings arranged so that in cross section each ring is situated at the corner of a rectangle, and the wire winding threaded so as to extend across and through the spaces between the rings.

6. Apparatus according to claim 2 wherein the heating element comprises a support consisting of a plurality of radially extending rods supported at their outer ends, posts on the inner ends of the rods, the wire winding being secured to and extending around the posts.

7. Apparatus according to claim 2 wherein the heating element comprises a support consisting of a plurality of vertically disposed rods arranged in spaced relationship and supported at opposite ends, the wire winding being attached to and extending around the vertically disposed rods.

8. In a device for measuring the content of paramagnetic gases in gas mixtures and comprising a chamber; a magnet for producing a non-homogeneous field within the chamber and having opposed parallel pole pieces; a toroidal support of insulating material near to and parallel with the end faces of the pole pieces and within the chamber; and a coiled wire supported by said support and in a part of said field for determining interaction of the gases in the chamber with the magnetic field.

9. In a device as in claim 8, said support being hollow and the coiled wire having its loops approximately in planes radial to the axis of the support and pole pieces.

10. In an apparatus for measuring the content of paramagnetic gases in a gas mixture, structure forming a chamber, a magnet having pole faces for producing a non-homogeneous magnetic field within the chamber; an electrical heating element within said chamber and field, said heating element extending from a pair of terminals in substantially a ring shape around and alongside the peripheral edges of the pole faces and within said field, and means for admitting gas to the chamber, the gas entering the chamber being caused to flow as a result of the combined magnetic and heating action of the magnet and heating element respectively over the heating element, the change of temperature of the heating element being a measure of the paramagnetic gas content of the mixture.

References Cited in the file of this patent

UNITED STATES PATENTS

| Number | Name | Date |
|---|---|---|
| 1,715,374 | Krueger | June 4, 1929 |
| 2,557,008 | Poole | June 12, 1951 |
| 2,603,964 | Foley et al. | July 22, 1952 |

FOREIGN PATENTS

| Number | Country | Date |
|---|---|---|
| 742,690 | Germany | Dec. 9, 1943 |
| 64,957 | Denmark | Oct. 1946 |